S. KULESZA.
THRESHING MACHINE.
APPLICATION FILED JAN. 2, 1912.
1,063,701.
Patented June 3, 1913.
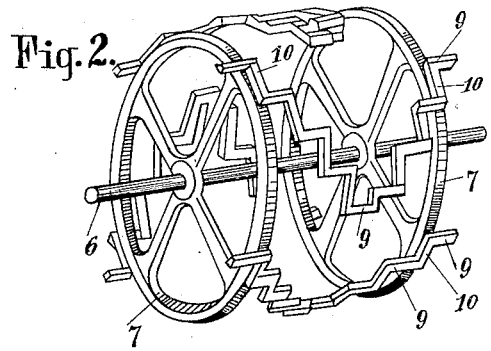
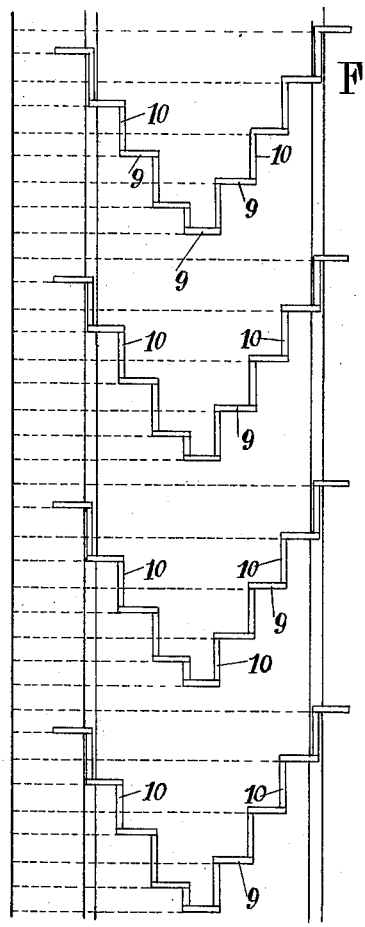
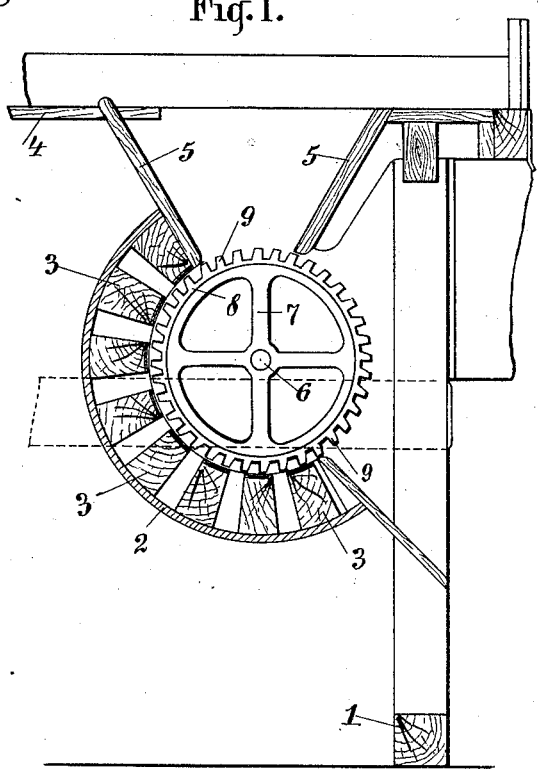
Inventor
Stanislaw Kulesza

UNITED STATES PATENT OFFICE.

STANISLAW KULESZA, OF SKORZEW, NEAR BUSK, RUSSIA.

THRESHING-MACHINE.

1,063,701.  Specification of Letters Patent.  Patented June 3, 1913.

Application filed January 2, 1912. Serial No. 668,939.

*To all whom it may concern:*

Be it known that I, STANISLAW KULESZA, a subject of the Czar of Russia, and residing at Skorzew, near Busk, Russian Poland, have invented certain new and useful Improvements in Threshing - Machines, of which the following is a specification.

My invention relates to threshing-machines.

Two kinds of threshing-machines have been known heretofore, to wit those comprising threshing-cylinders armed with spikes and those comprising threshing-cylinders carrying slats or flat beaters. In the former type a rapidly rotating drum carries a large number of spikes which pass between correspondingly arranged spikes on the concave plates and come into contact with the corn which is fed in longitudinally. This form of threshing-machine necessitates the corn being fed longitudinally; it is impossible to employ it for corn fed in broadside on. Likewise, it is impossible to use it for other cereals, *e. g.* peas, lupins and the like, because the branches of their stems do not admit of the threshing-machine being driven properly, as the stems and also the grain would be completely torn up. As is well known, threshing machines of this character are so constructed that on a rapidly rotating drum are arranged a number of beaters, extending along the entire breadth of said drum and coördinating with the firmly fastened slats or strips of the threshing basket and by which, ordinarily, the corn or other cereal with stalks to be threshed is fed in broadside. The disadvantage of these and similar constructions of machines is that in operation they operate efficiently only when the grain is fed in with regularity. Uneven feeding of the stalks results in the grain, as well as the straw, being completely mangled and crushed and in that condition it is unfit for use. In addition to the above, in such cases, the power required is such as can, through the carelessness of the operator, soon cause very annoying disturbances of the mechanism. The above disadvantages are brought about entirely by the fact that the strips at a given moment operate along their whole length.

An attempt has indeed been made heretofore to remove the above disadvantage by arranging on the surface of a metal cylinder a number of short beaters or teeth. A more efficient operation of the machine has thus been attained but there still remains one great annoyance which is that the firm attachment of these beaters or teeth is attended with greatest difficulty since they break off very easily and, moreover, the use of a metal cylinder adds relatively great expense.

The disadvantages above described of all the forms of construction of known threshing machines are avoided in the present invention by eliminating the use of a metal cylinder and arranging the wheels, or drum heads, on a common axle and connecting the peripheries of said wheels by a number of strips which form a plurality of beaters or teeth extending parallel to the axle, said beaters being connected to inoperative intermediate members. The form of construction of such strips can be carried out in widely different ways; among others, the strips may be arranged in the form of steps. Preferably, according to the purpose for which they are intended, these strips are arranged in the form of steps in such a manner that at a given moment and a given point only one short beater or tooth is operative.

The object of the invention will be clear from the foregoing description and the accompanying drawings, in which:

Figure 1 is a vertical section through a known threshing machine provided with my new threshing drum, Fig. 2 is a perspective view of the improved drum alone, showing one arrangement of the strips, and; Fig. 3 shows a modified arrangement of construction of the drum.

Referring to the drawing, 1 designates the frame of a threshing-machine comprising a concave plate 2 on which is firmly fixed a number of strips or slats 3. The table 4 is provided with a funnel-shaped inlet 5 through which the corn or other cereal to be threshed is introduced, preferably transversely, but when the threshing-machine is suitably constructed in a different manner the corn or the like may be fed in longitudinally.

The threshing-drum solely constituting the subject-matter of my invention comprises an axle 6 preferably carrying two wheels 7. On the wheels 7 which turn rapidly with the axle 6 are placed the strips forming the novel feature of this invention, the method of construction of which has already been described above and which may be worked out in a variety of ways; for example, as shown in Figs. 2 and 3, strips of this kind may be constructed in such a manner that step-like members are formed of metallic strips. These stepped members consist of the long piece or portion 9 which represents the beater proper, and cross pieces 10 which connect the long pieces, above mentioned, together in the form of steps. These strips may be of various lengths but they must be shorter than the breadths of the drum 8. The strips 9 are preferably staggered in such manner that there is always one strip in one longitudinal plane of the drum, as shown in Fig. 2 and particularly in the development of the drum shown in Fig. 3. These strips 9 may, however, be arranged otherwise; for example, step-shaped bodies may be formed from iron bars, such as are represented in Figs. 2 and 3. These step-like bodies consist of the longitudinal parts 9 forming the beating-strips proper, and the transverse parts 10 which connect the individual longitudinal parts in the form of steps. Here also the step-like bodies are preferably formed in such manner that there is only one beating-strip in any longitudinal plane of the drum. By means of a threshing drum constructed in this manner I attain that at any part of the drum the corn or other cereal is worked at any time only on a relatively short part of the breadth of the drum. Any irregularities in the feed of the corn consequently do not have the material disadvantages of known threshing-machines comprising slats because the material is able to escape more or less in consequence of the only partial contact with the threshing-drum or the strips. The step-like arrangement of the strips has, in addition, the special advantage that non-uniformly fed material is automatically distributed, and consequently all shaking, such as has occurred heretofore when non-uniform feeding took place, is avoided and a uniform force is constantly required for driving. The threshing-machine works just as well when the corn or other cereal is fed in the longitudinal direction or in the transverse direction, and likewise it is of no importance whether the cereal has only straight straw or branched stems.

It is to be understood that the constructive arrangement of these short strips is not limited to the above-described illustrative embodiments; numerous other constructions may be thought of without departing from the scope of the invention. Particularly, instead of two wheels 7, a larger number of wheels may be arranged on the axle 6 and each of these wheels may constitute a carrier for a number of strips. Also, two wheels may be connected by strips, and the strips may constitute the carriers for the short beating-strips proper.

I claim:—

1. In a threshing machine, the combination of a drum comprising spaced circular heads, an axis common to said heads, strips connecting the peripheral portions of the heads and secured thereto, each strip consisting of a plurality of beaters arranged parallel with the axis, and inoperative intermediate members connecting said beaters.

2. In a threshing machine, the combination of a drum comprising spaced circular heads, an axis common to said heads, strips connecting the peripheral portions of the heads and secured thereto, each strip consisting of a plurality of beaters arranged parallel with the axis, and inoperative intermediate members arranged transversely of the axis and connecting the beaters aforesaid.

3. In a threshing machine, the combination of a drum comprising spaced circular heads, an axis common to said heads, a plurality of strips carried by said heads and each strip consisting of portions extending from an intermediate point outwardly to the heads in the form of opposed steps, each step portion consisting of a number of beaters arranged along the axis aforesaid and of other portions arranged transversely of the axis, said last mentioned portions connecting said beaters.

4. In a threshing machine, the combination of a drum comprising spaced circular heads, an axis common to said heads, a plurality of strips carried by said heads and each strip consisting of portions extending from an intermediate point outwardly to the heads in the form of opposed steps, each step portion consisting of a number of beaters arranged along the axis aforesaid and of other portions arranged transversely of the axis, said last mentioned portions connecting said beaters, said beaters being so arranged that in a determined plane passing through the axis of the drum only one of the same is operative at a given time.

In testimony, that I claim the foregoing as my invention, I have signed my name in presence of two subscribing witnesses.

STANISLAW KULESZA.

Witnesses:
 FRANCIS TREMBICK,
 ANDREJ KUCWOJ.

Copies of this patent may be obtained for five cents each, by addressing the "Commissioner of Patents, Washington, D. C."